(12) United States Patent
Fujiwara

(10) Patent No.: US 7,995,744 B2
(45) Date of Patent: Aug. 9, 2011

(54) TELEPHONE INTERFACE CIRCUIT

(75) Inventor: Yoshinobu Fujiwara, Tokyo (JP)

(73) Assignee: Uniden Corporation, Tokyo (JP)

( * ) Notice: Subject to any disclaimer, the term of this patent is extended or adjusted under 35 U.S.C. 154(b) by 1225 days.

(21) Appl. No.: 11/669,470

(22) Filed: Jan. 31, 2007

(65) Prior Publication Data

US 2008/0181391 A1 Jul. 31, 2008

(51) Int. Cl.
*H04M 1/00* (2006.01)
(52) U.S. Cl. ......... 379/382; 379/386; 379/393; 379/394
(58) Field of Classification Search . 379/399.01–413.04
See application file for complete search history.

(56) References Cited

U.S. PATENT DOCUMENTS

| | | | |
|---|---|---|---|
| 4,475,012 A | 10/1984 | Coulmance | |
| 4,580,011 A | 4/1986 | Glaser | |
| 4,694,483 A | 9/1987 | Cheung | |
| 4,709,296 A | 11/1987 | Hung et al. | |
| 5,392,349 A | 2/1995 | Elder | |
| 5,796,767 A | 8/1998 | Aizawa | |
| 6,418,222 B2 | 7/2002 | Wong et al. | |
| 6,782,098 B1 * | 8/2004 | Fujiwara | 379/412 |
| 7,027,594 B2 | 4/2006 | Casey et al. | |
| 7,206,403 B2 | 4/2007 | Fujiwara | |
| 2004/0228060 A1 | 11/2004 | Fujiwara | |
| 2007/0025549 A1 | 2/2007 | Fujiwara | |
| 2008/0037772 A1 | 2/2008 | Fujiwara | |
| 2008/0037773 A1 | 2/2008 | Fujiwara | |
| 2008/0285741 A1 | 11/2008 | Fujiwara | |

OTHER PUBLICATIONS

Co-pending unpublished U.S. Appl. No. 12/268,895.

* cited by examiner

*Primary Examiner* — Fan Tsang
*Assistant Examiner* — Ibraham Sharifzada
(74) *Attorney, Agent, or Firm* — Steven J. Hultquist; Hultquist IP

(57) ABSTRACT

A hook switch turns on a transistor by connecting the positive electrode terminal of a capacitor to a base terminal of a transistor in an off-hook state, causing a speech circuit and telephone lines to be connected. The hook switch turns off the transistor by disconnecting the positive electrode terminal of the capacitor from the base terminal of the transistor in an on-hook state, causing the speech circuit and the telephone lines to be disconnected. A holding circuit holds the voltage at the positive electrode terminal of the capacitor at a substantially fixed value by charging the capacitor with electric power supplied from the telephone lines in an off-hook state.

3 Claims, 2 Drawing Sheets

TELEPHONE INTERFACE CIRCUIT

BACKGROUND

The present invention relates to a telephone interface circuit and in particular relates to an improvement in which the telephone interface circuit is disconnected from a telephone line when extension-to-extension calls are made.

FIG. 1 shows the circuit structure of a telephone interface circuit 10 in the prior art. The telephone interface circuit 10 controls the interface between a speech circuit 30 and telephone lines L1 and L2. The telephone interface circuit 10 mainly comprises a varistor V1, a diode bridge 20, a hook switch 40, and transistors Q1 and Q2.

Transistor Q1 is a PNP transistor, and transistor Q2 is an NPN transistor. A resistor R1 is connected from an emitter terminal E1 to a base terminal B1 of the transistor Q1. The emitter terminal E1 of the transistor Q1 is connected to the cathode of a diode D1, and a collector terminal C1 is connected to the speech circuit 30. A resistor R10 is connected between the base terminal B1 of the transistor Q1 and a collector terminal C2 of the transistor Q2. An emitter terminal E2 of the transistor Q2 branches in two directions, in one direction the emitter terminal E2 is connected to the speech circuit 30 and in the other direction the emitter terminal E2 is connected to the anode of a diode D4. A resistor R527 is connected between a base terminal B2 and the emitter terminal E2 of the transistor Q2. The base terminal B2 of the transistor Q2 is connected to a microcomputer (not shown in the drawings) via a resistor R4. The microcomputer (not shown in the drawings) controls the electric potential of a terminal HC at times of on-hook operations, off-hook operations, dial pulse transmitting operations, and the like. Also, the base terminal B2 of the transistor Q2 is connected to a terminal 1 of the hook switch 40 via a resistor R21.

The varistor V1 absorbs voltage surges on the telephone lines L1 and L2 (for example high voltage of the order of 270 volts).

The diode bridge 20 rectifies the signal from telephone lines L1 and L2 and supplies the signal to the speech circuit 30. The diode bridge 20 is formed from four diodes, D1 to D4.

The hook switch 40 connects the terminal 1 and a terminal 3 when it is in an off-hook state. In this state forward voltage is supplied between the base terminal B2 and the emitter terminal E2 of the transistor Q2 via the resistor R21, thus the transistor Q2 turns on. Then the electric potential at the base of the transistor Q1 rises causing transistor Q1 to also turn on. The microcomputer (not shown in the drawings) controls the electric potential of the base of the transistor Q2 via the terminal HC, in response to the input of a dialed number at the time a call is initiated. Thus the transistor Q1 transmits a dial pulse signal.

The hook switch 40 connects the terminal 1 and a terminal 2 when in an on-hook state. Then the transistor Q1 turns off, disconnecting the speech circuit 30 from the telephone lines L1 and L2.

SUMMARY

Meanwhile in this type of telephone interface circuit 10, when making extension-to-extension calls, the microcomputer (not shown in the drawings) performs control to turn off the transistors Q1 and Q2, and disconnect the speech circuit 30 from the telephone lines L1 and L2.

According to specifications in the United States the resistance between the tip and ring at the time of an extension-to-extension call must be 5 MΩ or more.

However, in the prior art described above, the resistor R21, which is of the order of several hundred KΩ, is connected between the telephone lines L1 and L2, hence the conditions of the specification described above cannot be satisfied.

Therefore the present invention has an objective of providing a telephone interface circuit than can satisfy the conditions of the specification described above.

The telephone interface circuit of the present invention comprises the following in order to provide the objective described above, a speech circuit, a transistor which turns on, is in an off-hook state, to connect the speech circuit to telephone lines, and which turns off in an on-hook state to disconnect the speech circuit from the telephone lines, a capacitor for storing an electric charge to turn on the transistor, a charging circuit for charging the capacitor with electric power supplied by the telephone lines, a hook switch for turning on the transistor by connecting a positive electrode terminal of the capacitor to an electric current control terminal of the transistor in an off-hook state, and for turning off the transistor by disconnecting the positive electrode terminal of the capacitor from the electric current control terminal of the transistor in an on-hook state, and a holding circuit for holding a voltage at the positive electrode terminal of the capacitor at a substantially fixed value by charging the capacitor in an off-hook state with electric power supplied from the telephone lines.

The charging circuit can be structured for example with a resistance element. The resistor employed to structure the charging circuit must be such that the resistance between the tip and the ring, at the time of extension-to-extension calls, is 5 MΩ or more.

DETAILED DESCRIPTION

Figure 1:
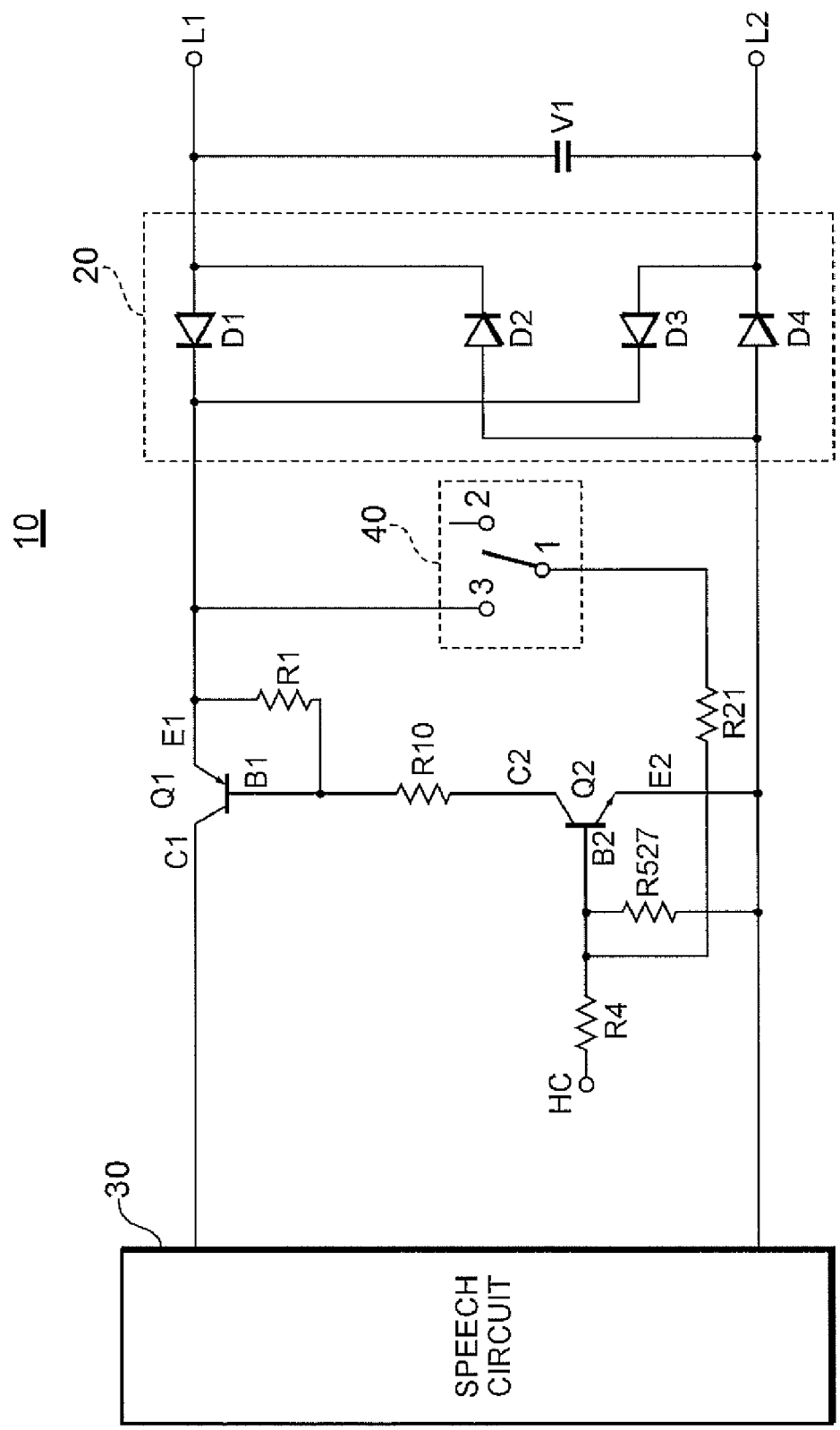
FIG. 1 shows the circuit structure of the telephone interface circuit in the prior art.

A description will be given below of an embodiment of the present invention in reference to the drawing.

Figure 2:
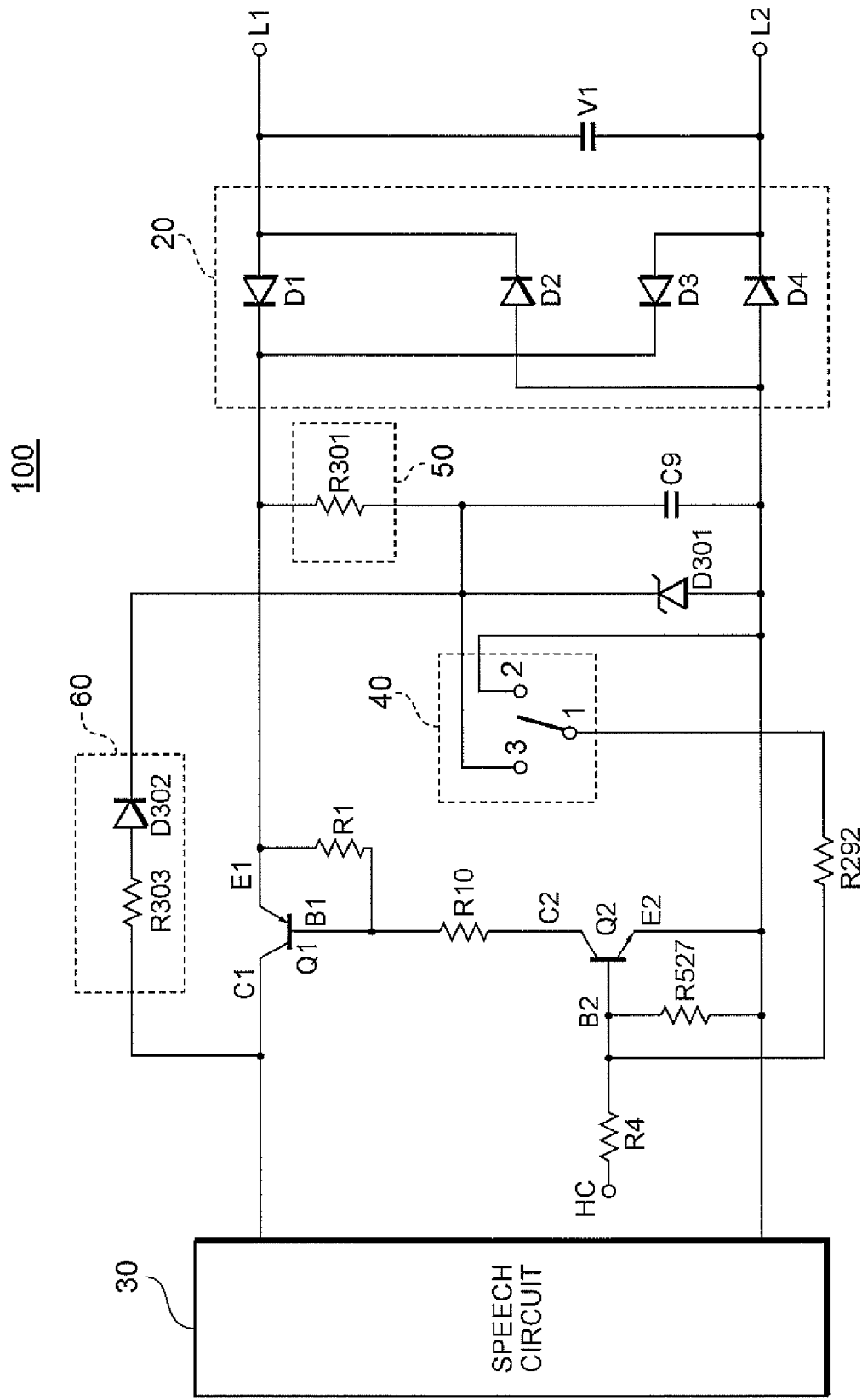
FIG. 2 shows the circuit structure of the telephone interface circuit according to an embodiment of the present invention.

FIG. 2 shows the circuit structure of a telephone interface circuit 100 according to an embodiment of the present invention. FIG. 2 employs the same reference numbers for the same elements shown in FIG. 1, thus detailed descriptions will be omitted.

A capacitor C9 is for controlling the electric potential of a base terminal B2 of a transistor Q2 (more specifically, the electric potential from the base terminal B2 to an emitter terminal E2) when a hook switch is in an off-hook state, and for creating the necessary electric charge to turn on the transistor Q2. The positive electrode terminal of the capacitor C9 is connected to a telephone line L1 via a charging circuit 50 and a diode bridge 20, while the negative electrode terminal of the capacitor C9 is connected to a telephone line L2 via the diode bridge 20.

The charging circuit 50 is for keeping the capacitor C9 always charged with electric power supplied by the telephone lines L1 and L2. In order to simplify the explanation of the present embodiment an example is shown in which the charging circuit 50 is structured with one resistor R301, however, the charging circuit 50 may be structured with a plurality of resistors. The electric charge for turning on the transistor Q2 is a charge supplied by the capacitor C9 in a time shorter than a time constant that is the product of the resistance of the resistor R301 and the capacitance of the capacitor C9 (for example a time less than or equal to one-tenth of the time constant).

A Zener diode D301 is connected in parallel to the capacitor C9. The Zener diode D301 is provided for protecting the capacitor C9 against voltages higher than the withstanding voltage of the capacitor C9.

A terminal 1 of the hook switch 40 is connected to the base terminal B2 of the transistor Q2 via a resistor R292. A terminal 3 of the hook switch is connected to the positive electrode terminal of the capacitor C9. A terminal 2 of the hook switch is connected to the negative electrode terminal of the capacitor C9.

A holding circuit 60 is connected between a collector terminal C1 and the positive electrode terminal of the capacitor C9, and directs a portion of the current flowing through the collector terminal C1 to the capacitor C9 when the hook switch is in an off-hook state in order to hold the voltage at the positive terminal of the capacitor C9 at a substantially fixed value.

The holding circuit 60 has a resistor R303 and a diode D302, which are connected in series. The diode D302 prevents the charge on the capacitor C9 from discharging when the hook switch is in an on-hook state. The anode of the diode D302 is connected to the collector terminal C1 of a transistor Q1 via the resistor R303, and the cathode of the diode D302 is connected to the positive electrode terminal of the capacitor C9.

A resistor R527 is connected between the base terminal B2 and the emitter terminal E2 of the transistor Q2.

Next, the operation of the telephone interface circuit 100 will be explained.

The capacitor C9 is charged by electric power supplied from the telephone lines L1 and L2, via the charging circuit 50 when the telephone interface circuit 100 is connected to the telephone lines L1 and L2. The time necessary to fully charge the capacitor C9 depends on the time constant, which is the product of the resistance of the resistor R301 and the capacitance of the capacitor C9, however, it is acceptable for the charge on the capacitor C9 to reach the necessary charge to turn on transistor Q2, hence the time necessary to charge the capacitor C9 may be a very short time (a time which is less than or equal to one-tenth of the time constant).

The hook switch 40 connects terminals 1 and 2 when it is in an on-hook state. The charge, which has been stored on the capacitor C9, is not discharged due to the effect of the diode D302.

The hook switch 40 connects terminals 1 and 3 when it is in an off-hook state. This causes the charge that has been stored on the capacitor C9 to flow to the base terminal B2 of the transistor Q2 via the resistor R292. The transistor Q2 turns on when the forward voltage between the base and emitter of the transistor Q2 exceeds a predetermined threshold voltage. Through this the electric potential at the base of the transistor Q1 drops, causing the transistor Q1 to also turn on.

A portion of the current flowing through the collector terminal C1 of the transistor Q1 is directed to the positive electrode terminal of the capacitor C9 via the holding circuit 60, holding the voltage at the positive electrode terminal of the capacitor C9 at a substantially fixed value. More specifically, during the period while an off-hook state is maintained, a charge for compensating for the charge that flows out from the capacitor C9 to the base terminal B2 is directed from the collector terminal C1 to the capacitor C9, thus the voltage at the positive electrode terminal of the capacitor C9 is maintained at a substantially fixed value.

When the hook switch is in an off-hook state and an extension-to-extension call is made, a microcomputer (not shown in the drawings) lowers the electric potential of the base of the transistor Q2 via a terminal HC, and turns off both the transistor Q1 and the transistor Q2, thus the telephone lines L1 and L2 are disconnected from the speech circuit 30. At this time the current flowing in the telephone line L1 passes the charging circuit 50, with a portion of the current returning to the telephone line L2 passing through the Zener diode D301, and the remaining portion of the current returning to the telephone line L2 passing through the hook switch 40, the resistor R292 and the resistor R527.

If a resistor is employed having a resistance of 5 MΩ or more as the resistor R301, then the resistance between the tip and ring (between telephone lines L1 and L2) when making an extension-to-extension call will meet the specification of 5 MΩ or more.

I claim:

1. A telephone interface circuit comprising:
    a speech circuit;
    a transistor which turns on, in an off-hook state, to connect the speech circuit to telephone lines and which turns off, in an on-hook state, to disconnect the speech circuit from the telephone lines;
    a capacitor for storing an electric charge to turn on the transistor;
    a charging circuit for charging the capacitor with electric power supplied by the telephone lines;
    a hook switch for turning on the transistor by connecting a positive electrode terminal of the capacitor to an electric current control terminal of the transistor in an off-hook state, and for turning off the transistor by disconnecting the positive electrode terminal from the electric current control terminal in an on-hook state in order to; and
    a holding circuit for holding a voltage at the positive electrode terminal at a substantially fixed value by charging the capacitor with the electric power supplied from the telephone lines in an off-hook state.

2. The telephone interface circuit according to claim 1, wherein
    the charging circuit includes a resistance element, and
    an amount of an electric charge for turning on the transistor is an amount of the electric charge supplied to the capacitor in a time shorter than a time constant which is a product of a resistance of the resistance element and a capacitance of the capacitor.

3. The telephone interface circuit according to claim 1, further comprising a diode element for preventing discharge of the electric charge stored on the capacitor in an on-hook state.

* * * * *